United States Patent
Minor

(10) Patent No.: US 9,113,307 B2
(45) Date of Patent: Aug. 18, 2015

(54) METHOD OF VALIDATING CELLULAR CARRIER RECORDS ACCURACY

(71) Applicant: John Billy Minor, Odessa, TX (US)

(72) Inventor: John Billy Minor, Odessa, TX (US)

( * ) Notice: Subject to any disclaimer, the term of this patent is extended or adjusted under 35 U.S.C. 154(b) by 78 days.

(21) Appl. No.: 14/169,140

(22) Filed: Jan. 30, 2014

(65) Prior Publication Data

US 2014/0213307 A1    Jul. 31, 2014

Related U.S. Application Data

(60) Provisional application No. 61/758,449, filed on Jan. 30, 2013.

(51) Int. Cl.
| | |
|---|---|
| *H04W 24/00* | (2009.01) |
| *G01S 3/02* | (2006.01) |
| *H04W 4/02* | (2009.01) |

(52) U.S. Cl.
CPC ..................... *H04W 4/028* (2013.01)

(58) Field of Classification Search
CPC ............. H04W 4/02; H04W 8/02; H04W 4/021–4/046; H04W 64/00–64/006
USPC ............. 455/423–425, 446, 456.1–457; 703/13–22; 342/356–357.77, 450–465
See application file for complete search history.

(56) References Cited

U.S. PATENT DOCUMENTS

| | | | | |
|---|---|---|---|---|
| 5,408,683 | A * | 4/1995 | Ablay et al. .................. 455/433 |
| 5,561,836 | A * | 10/1996 | Sowles et al. ................. 455/428 |
| 5,592,172 | A * | 1/1997 | Bailey et al. .................. 342/350 |
| 5,930,717 | A * | 7/1999 | Yost et al. .................. 455/456.2 |
| 2002/0016180 | A1 * | 2/2002 | Derosier et al. .............. 455/522 |
| 2003/0040272 | A1 * | 2/2003 | Lelievre et al. .............. 455/3.06 |
| 2003/0040318 | A1 * | 2/2003 | Fattouch ...................... 455/446 |
| 2005/0261004 | A1 * | 11/2005 | Dietrich et al. ............ 455/456.2 |
| 2005/0282540 | A1 * | 12/2005 | Motamedi et al. ............ 455/423 |
| 2007/0082677 | A1 * | 4/2007 | Donald Hart et al. ..... 455/456.1 |
| 2009/0068970 | A1 * | 3/2009 | Ahmed et al. ............. 455/161.1 |
| 2010/0022263 | A1 * | 1/2010 | Stamoulis et al. ............ 455/501 |
| 2010/0103868 | A1 * | 4/2010 | Meng et al. .................. 370/328 |
| 2011/0319067 | A1 * | 12/2011 | Adams et al. .............. 455/422.1 |
| 2012/0064908 | A1 * | 3/2012 | Fox et al. .................. 455/452.2 |
| 2012/0264447 | A1 * | 10/2012 | Rieger, III .................. 455/456.1 |
| 2012/0315935 | A1 * | 12/2012 | Wang Helmersson et al. ............................. 455/501 |
| 2013/0005349 | A1 * | 1/2013 | Sanders et al. ............. 455/456.1 |
| 2014/0011513 | A1 * | 1/2014 | Watts et al. ................ 455/452.2 |

* cited by examiner

*Primary Examiner* — Rafael Pérez-Gutiérrez
*Assistant Examiner* — Mark G. Pannell

(57) ABSTRACT

A method of validating cellular device location record accuracy is intended to validate and refine cellular carrier records accuracy for investigation and litigation purposes. Records provided by a cellular carrier and other information are analyzed to validate or refine a possible and/or estimated location of a specified cellular device during a specified time frame. More specifically, the location of a specified radio communications transceiver cell site is verified, a nominal cellular wireless signal coverage map is produced, and various pieces of information regarding potential service disruptions during the specified time frame are analyzed in order to produce a more accurate coverage map during the specified time frame for the purpose of quantitatively defining probable or potential locations for the specified cellular device.

14 Claims, 9 Drawing Sheets

METHOD OF VALIDATING CELLULAR CARRIER RECORDS ACCURACY

The current application claims a priority to the U.S. Provisional Patent application Ser. No. 61/758,449 filed on Jan. 30, 2013.

FIELD OF THE INVENTION

The present invention relates generally to telecommunications carriers. More specifically, the present invention is a method and process to validate cellular carrier records accuracy and cellular carrier records signals analysis and mapping accuracy.

BACKGROUND OF THE INVENTION

The cellular industry is required by numerous laws worldwide to produce various business records related to the use of subscriber cell phone handsets 1) to be available to communicate via the cellular carrier network infrastructure during idle mode and 2) to communicate using voice, video, text message, Internet data, or other communications via the cellular network infrastructure, independent of communications technologies used.

The records produced by cellular carriers are frequently used to establish that a subscriber mobile station or user equipment, handset, tablet or other subscriber operated device was located geographically, within an accuracy range of 5 meters to several hundred square miles, near the location of critical events related to a variety of investigations and litigation. Analysis results from cellular carrier records often contain errors. Errors remain undetected due to incorrect validation of the accuracy of the records, failure to validate the records or incorrect signals analysis and mapping.

It is therefore an object of the present invention to introduce a method and process to validate cellular carrier records accuracy and cellular carrier records signals analysis and mapping accuracy.

DETAIL DESCRIPTIONS OF THE INVENTION

Figure 1:
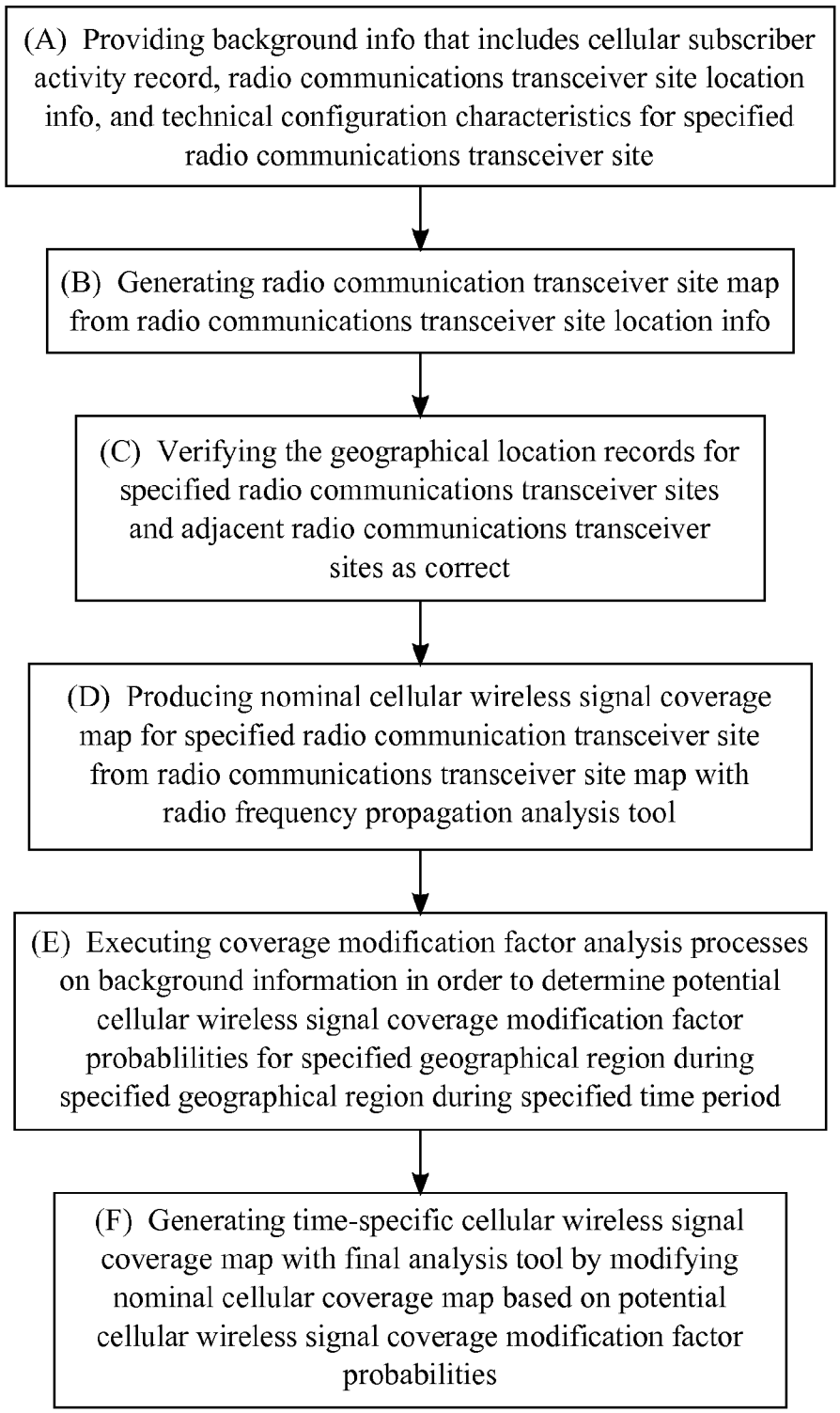
FIG. 1 is a stepwise flow diagram describing the overall process of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a method to validate cellular carrier records accuracy and mapping accuracy in regards to the location of a specified cellular device. The present invention is intended to validate cellular carrier records accuracy for investigation and litigation purposes. In general, the process of the present invention analyzes multiple different records and other information in order to validate or refine the possible and/or estimated location of the specified cellular device during a specified time frame. More specifically, in the process of the present invention a nominal cellular wireless signal coverage map is produced, and various pieces of information regarding potential service disruptions are analyzed in order to produce a more accurate coverage map during the specified time frame for the purpose of quantitatively defining probable or potential locations for the specified cellular device.

In the preferred embodiment of the present invention, the entire process may be automated and/or completed by executing computer-executable instructions stored on a non-transitory computer-readable medium, but current technology or software applications may not currently be in existence. Therefore, it may be necessary in certain situations where technology or software is lacking for certain steps or processes to be carried out by a human.

The background information to be provided may be obtained in a variety of different ways. In particular, a cellular subscriber activity record, radio communications transceiver site location information, and a plurality of technical configuration characteristics for a specified radio communications transceiver site are initially provided by the cellular carrier.

The cellular subscriber activity record, also known as a cellular carrier call detail record, is initially obtained by any appropriate method, but is likely to be obtained through legal procurement procedures such as a subpoena, a court order, or a search warrant. The cellular subscriber activity record should contain location information for the specified cellular device. If the location information is not present, the cellular carrier is requested for the location information through appropriate methods until the location information is received. The cellular subscriber activity record corresponds to the specified cellular device which is registered to the cellular carrier. The location information included with the cellular subscriber activity record typically indicates the specified cellular device being registered to a specified radio communications transceiver site during a specified time period. The nature of the specified time period will vary depending on the nature of the situation for which the cellular subscriber record is being analyzed. The specified time period may vary from as short as several minutes to as long as several days, weeks or months. This provides a rough estimate of the location of the specified cellular device since cellular networks utilize a grid of radio communications transceiver sites, each with limited range.

The specified radio communications transceiver site and the adjacent radio communications transceiver sites are associated with the cellular carrier and provide wireless cellular service to a specified geographical region. The radio communications transceiver site location information provided by the cellular carrier should include geographical location records indicating global positioning system (GPS) coordinates or another location indicator for the specified radio communications transceiver site as well as any adjacent radio communications transceiver sites, wherein the adjacent radio communications transceiver sites surround the specified radio communications transceiver site. For each component of the cellular subscriber activity record containing location related information each step of the process is executed based upon availability of data through various techniques using software, hardware instruments, and other appropriate methods. Additionally, formatting various data, results and other information from various steps in the process for use in subsequent steps should be understood to be implied wherever necessary.

As described in FIG. 1, the overall process of the present invention is as follows. As an initial preparatory step, a transceiver site neighborhood map is generated from the radio communications transceiver site location information. The radio communications transceiver site map depicts locations for the specified radio communications transceiver site and the adjacent radio communications transceiver sites in the surrounding area. The geographical location records for the specified radio communications transceiver site are then verified, and a nominal cellular wireless signal coverage map for the specified radio communications transceiver site is produced using a radio frequency propagation analysis tool. Subsequently, a plurality of coverage modification factor analysis process are executed to analyze the background information in order to determine a plurality of potential coverage modification factor probabilities for the specified geographical region during the specified time period. Finally, a time-specific cellular wireless signal coverage map is generated with a final analysis tool by modifying the nominal cellular wireless signal coverage map based on the potential coverage modification factor probabilities.

The first main step in validating the accuracy of the cellular subscriber activity record is to verify the geographical location records for the specified radio communications transceiver site and the adjacent radio communications transceiver sites as correct. Clearly, if the cellular subscriber activity record indicates the specified cellular device as being registered to a non-existent radio communications transceiver site, the record can be safely determined to be incorrect.

Figure 2:
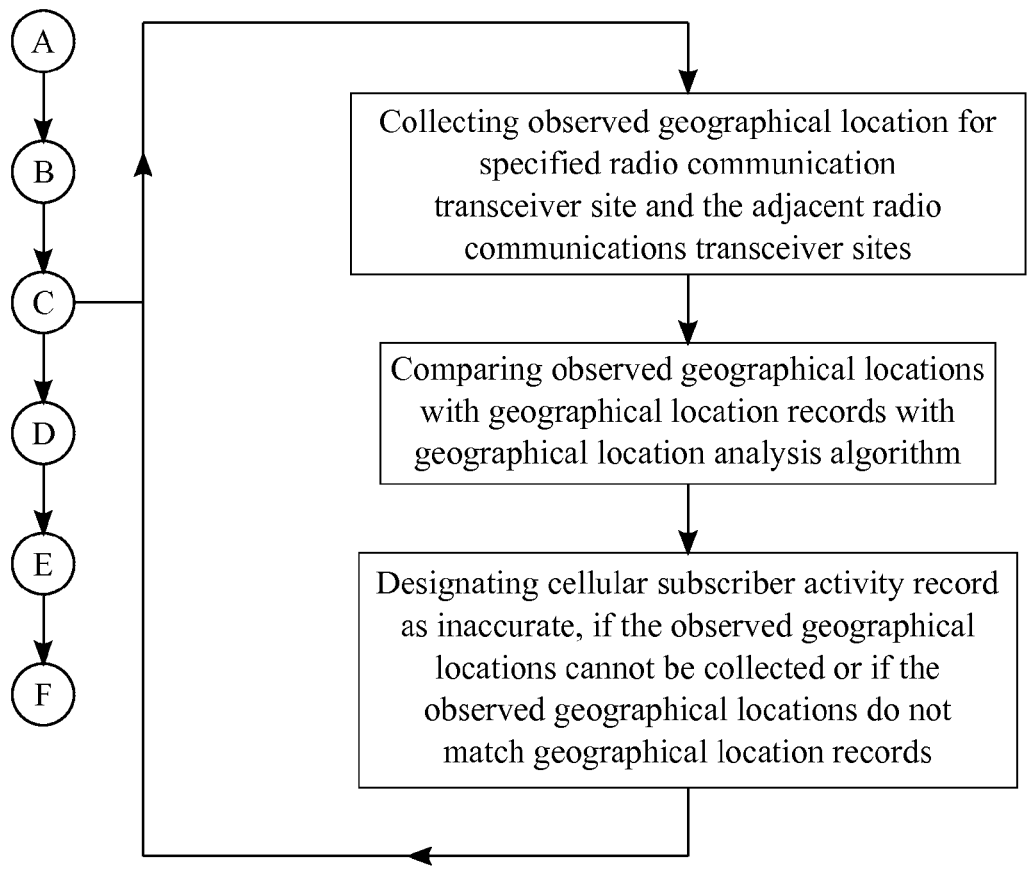
FIG. 2 is a stepwise flow diagram describing the step for verifying the geographical location records for radio communications transceiver sites.

Referring to FIG. 2, observed geographical locations for the specified radio frequency communications transceiver site and the adjacent radio frequency communications transceiver sites are collected, received or retrieved from a database. The observed geographical locations may be collected, received or retrieved by any appropriate means, such as, but not limited to, navigating to the specified radio communications transceiver site with a GPS capable instrument in order to visually verify that the specified radio communications transceiver site exists, research of licensing authority databases using internet browser software or another database search software tool to verify that the location existed at the corresponding geographical location record during the specified time frame, or using internet based search engine mapping or other satellite or aerial viewing capabilities, or any combination of the aforementioned techniques. It should be noted that herein the specific methods of providing, collecting, receiving or retrieving information are interchangeable for the purposes of the present invention.

The observed geographical locations are compared with the geographical location records with a geographical location analysis algorithm or another method as appropriate which is capable of comparing the observed geographical locations and the geographical location records, such as a simple comparison algorithm. The cellular subscriber activity record is designated as inaccurate if the observed geographical locations cannot be collected due to the specified radio frequency communications transceiver site not existing, or if the observed geographical locations do not match the geographical location records. In the preferred embodiment, a metric for validating the geographical location records is an accuracy probability of the geographical location records for the specified radio communications transceiver site and the adjacent radio communications transceiver sites along with specific identities of errant locations. Preferably, this metric is used with the final analysis tool to generate the time-specific cellular wireless signal coverage map. For some legal cases, verifying the geographical location of the specified radio frequency communications transceiver site may be sufficient as evidence and the subsequent steps may be skipped.

Figure 3:
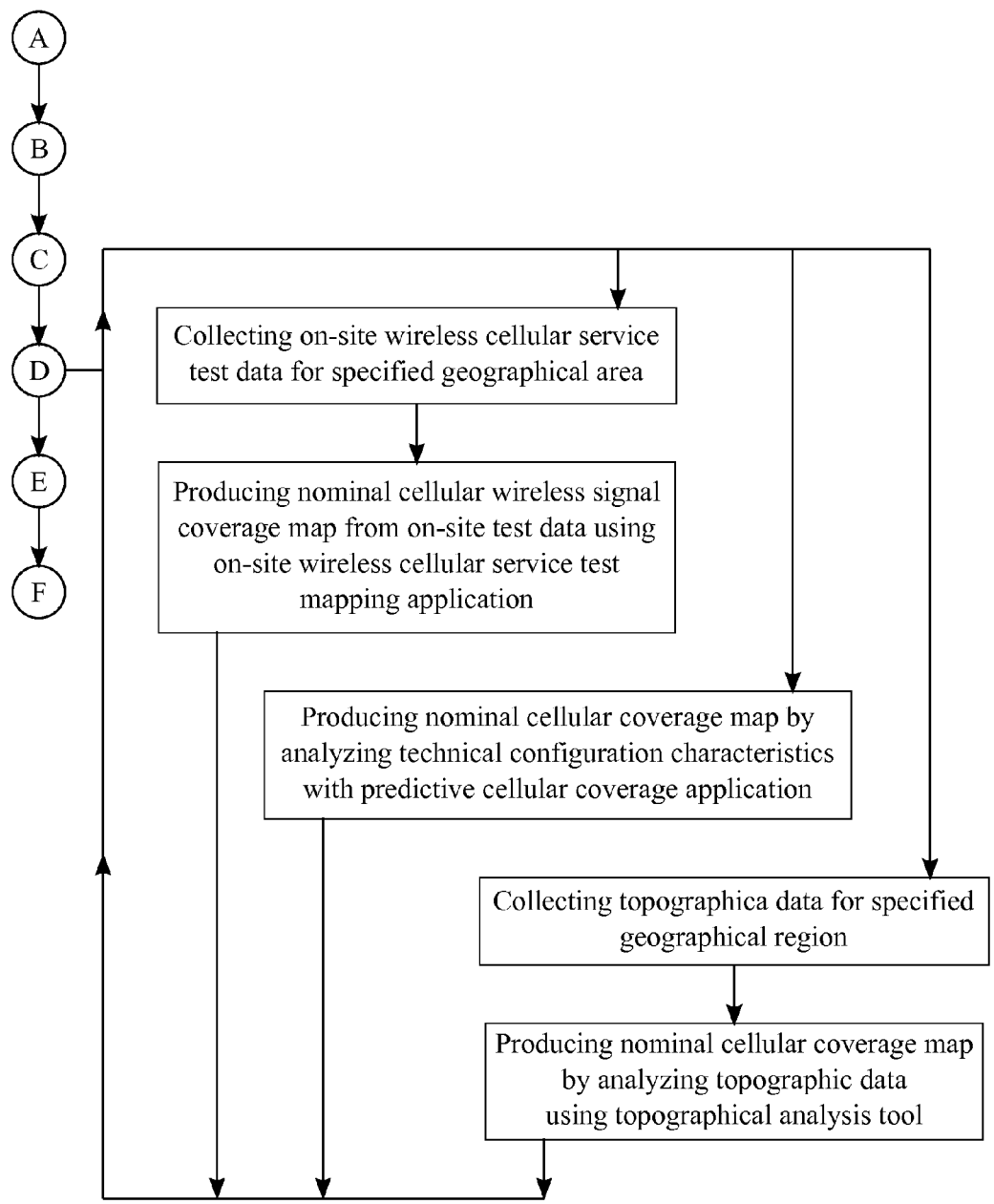
FIG. 3 is a stepwise flow diagram describing the process for producing the nominal cellular wireless signal coverage map.

After the geographical location records are verified, a nominal cellular wireless signal coverage map for the specified radio communications transceiver site is produced from the radio communications transceiver site map with a radio frequency propagation analysis tool, as described in FIG. 3. The nominal cellular wireless signal coverage map describes a cellular wireless signal coverage boundary around the specified radio communications transceiver site and the adjacent radio communications transceiver sites. The nominal cellular wireless signal coverage map also describes cellular wireless signal coverage quality probability for a plurality of sub regions within the cellular wireless signal coverage boundary. The radio frequency propagation analysis tool is used to determine reflection, refraction, absorption or other radio frequency modification factors affecting cellular service to the specified geographical location. This step involves determination and validation of morphologies such as topography, forest or other plant growth type/density, and man-made structure type/reflectivity/density to determine the radio frequency attenuating, absorbing or reflecting effects on the specified geographical region in the analysis and graphical mapping depiction as appropriate with regards to method used or data available.

The nominal cellular wireless signal coverage map may be produced in several ways. One way to produce the nominal cellular wireless signal coverage map is by collecting, receiving or retrieving on-site wireless cellular service test data. The on-site wireless cellular service test data is initially collected by what is commonly known as a drive or walk test, depending on the area to be tested. The on-site wireless cellular service test data may be collected as part of the present invention, or may be provided initially by the cellular carrier as part of the background information. On-site wireless cellular service date testing is performed using cellular network testing equipment including, but not limited to cellular handsets in test or engineering mode, specific test equipment operating at cellular frequencies, and software designed for drive or performance testing of a cellular network. The cellular network testing equipment may also be used to determine the list of adjacent radio communication transceiver sites in addition to determining performance characteristics for the adjacent radio communication transceiver sites.

Once the on-site wireless cellular service test data is collected for the specified geographical area, the nominal cellular wireless signal coverage map is produced from the on-site wireless cellular service test data using an on-site wireless cellular service test mapping application. In this case, the on-site wireless cellular service test mapping application is the desired radio frequency propagation analysis tool.

A second method for producing the nominal cellular coverage map is to analyze the plurality of technical configuration characteristics with a predictive cellular coverage application. The technical configuration characteristics may be collected, procured, retrieved or received in any manner available, useful and/or appropriate, such as, but not limited to, internet web browser based research of communication licensing authority (Federal Communications Commission) records and procurement of transceiver site records. Legal procurement procedures such as subpoena, court order, or search warrant may also be utilized. Relevant technical configuration characteristics may include, but are not limited to, radio communications transceiver site location GPS coordinates, antenna array azimuths, structure height, ground elevation at the site, antenna array height, antenna array down tilt, transmit/receive level settings, construction date, and radio propagation service area boundary.

In a third method for producing the nominal cellular wireless signal coverage map, topographic data is collected or retrieved from a database for the specified geographical region. The topographic data includes, but is not limited to, gradients and relative altitude of the radio communications transceiver site and surrounding area. The nominal cellular wireless signal coverage map is then produced by analyzing the topographic data using a topographic analysis tool. In this case, the topographic analysis tool is the desired radio frequency propagation analysis tool. A metric for the nominal cellular coverage map is an accuracy probability of the projected radio frequency propagation and attenuation characteristics within the specified geographical area during the specified time period.

The previous methods for producing the nominal cellular wireless signal coverage map may be utilized in an either/or fashion, independently from or in addition to each other as convenient or as data is available.

The nominal cellular wireless signal coverage map is a representation of expected cellular coverage at any time under normal conditions and may be considered a general predictive map. However, the nominal cellular wireless signal coverage map cannot be considered to always be accurate since a variety of phenomena may affect the cellular wireless signal coverage provided by the specified radio communications transceiver site.

Therefore, after producing the nominal cellular wireless signal coverage map, a plurality of coverage modification factor analysis processes are executed on the background information. This is done in order to determine a plurality of potential cellular wireless signal coverage modification factor probabilities for the specified geographical region during the specified time period. Each of the plurality of coverage modification factor analysis processes are similar in nature, each with a certain type of phenomenon being analyzed by a relevant algorithm in order to produce a relevant probability that the phenomenon caused a change in the cellular coverage for the specified geographical region during the specified time period.

Figure 4:
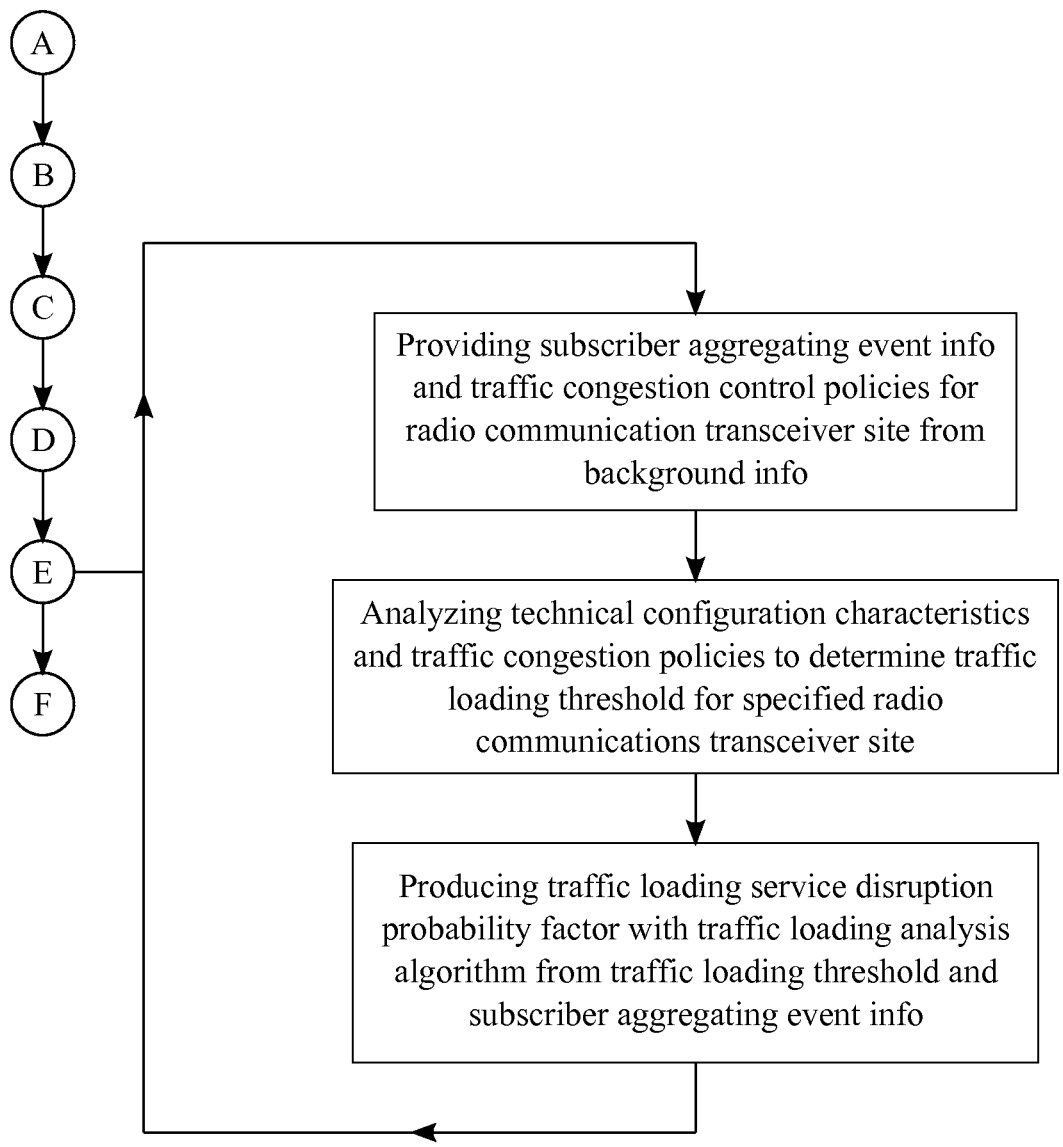
FIG. 4 is a stepwise flow diagram describing the traffic loading analysis process.

A first process from the plurality of coverage modification factor analysis processes is a traffic loading analysis process, as described in FIG. 4. In the traffic loading analysis process, subscriber aggregating event information and traffic congestion control policies from the background information are provided, collected, received or retrieved through relevant means. The subscriber aggregating event information indicates events causing a gathering of cellular subscribers near the specified radio communications transceiver site and/or one or more of the adjacent radio communications transceiver sites during the specified time period.

The technical configuration characteristics previously obtained and traffic congestion policies are analyzed to determine a traffic threshold for the specified radio communications transceiver site. The technical configuration characteristics relevant for the traffic loading analysis process may include, but are not limited to: radio communications transceiver site location GPS coordinates including longitude, latitude and altitude, antenna type, antenna horizontal and vertical beam width, antenna azimuth, antenna radiation center, site transmission equivalent/effective isotropic radiated power settings, link budget power levels, cell access parameters, site type, site transmission equivalent manufacturer/technology in use, detailed frequency plan, site tower height, antenna array height, physical cabling diagram, and a listing of first-tier neighbor cells.

This analysis is a probability calculation based upon the technical configuration characteristics threshold parameters and aggregating event congestion calculated probable estimates. The traffic loading threshold indicates a maximum for cellular subscribers registered to the specified radio communications transceiver site and/or one or more of the adjacent radio communications transceiver sites at one time.

A traffic loading service disruption probability factor is then produced with a traffic loading analysis algorithm using the traffic loading threshold and the subscriber aggregating event information. The traffic loading disruption probability factor indicates the probability that a traffic loading event resulted in disrupting cellular service provided by one or more of the adjacent radio communications transceiver sites within the specified geographical region during the specified time period. A metric for the traffic loading analysis process is the probability that cellular communications traffic loading or congestion (possibly due to subscriber aggregating events) during the specified time period disrupted or modified cellular service provided by the specified radio communications transceiver site and/or one or more of the adjacent radio communications transceiver sites.

Figure 5:
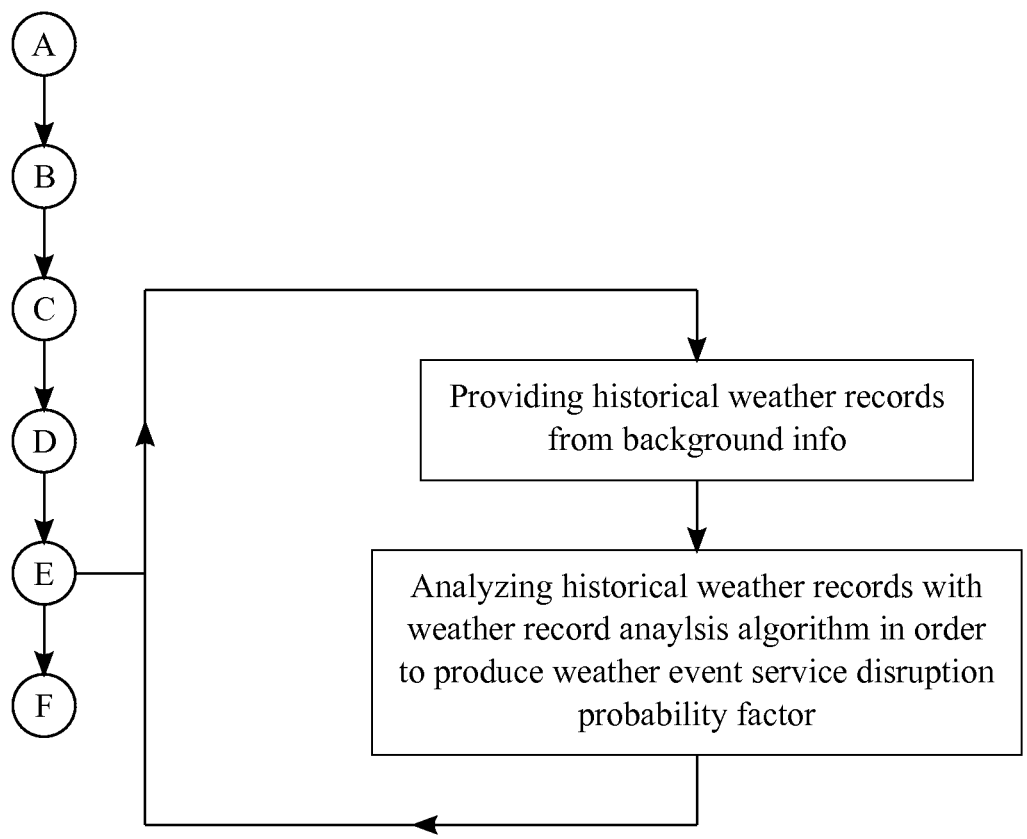
FIG. 5 is a stepwise flow diagram describing the weather analysis process.

A second process from the plurality of coverage modification factor analysis processes is a weather analysis process as described in FIG. 5. In the weather analysis process, historical weather records from the background information are provided, collected, received or retrieved through relevant means, such as, but not limited to, a web browser or other database search software tool. The historical weather records indicate any relevant weather conditions for the specified geographical region during the specified time period. Factors such as, but not limited to, temperature, precipitation, humidity, barometric pressure and season may change radio frequency propagation characteristics. Lightning discharge or precipitation may also induce outages which would have altered the operation of the cellular network and thereby altered coverage conclusions in signals analysis and mapping depictions. If possible radar sweep data and animated precipitation radar graphics for events located within 25 miles of the specified radio communications transceiver cell site.

The historical weather records are analyzed with a weather record analysis algorithm in order to produce a weather event service disruption probability factor. The weather event service disruption probability factor indicates the probability that a weather event resulted in disrupting cellular service provided by the specified radio communication transceiver site and/or one or more of the adjacent radio communications transceiver sites within the specified geographical region during the specified time period.

Figure 6:
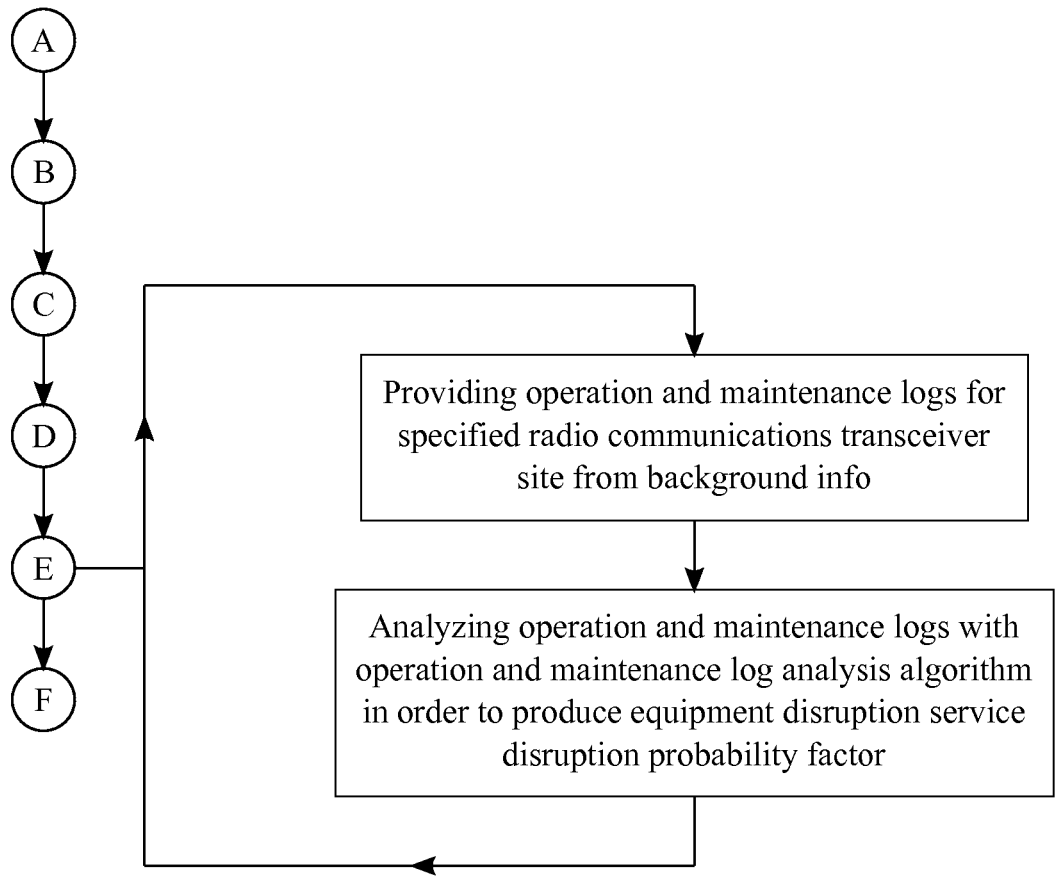
FIG. 6 is a stepwise flow diagram describing the operation and maintenance log analysis process.

A third process from the plurality of coverage modification factor analysis processes is an operation and maintenance log analysis process as described in FIG. 6. In the operation and maintenance log analysis process, operation and maintenance logs for the specified radio communications transceiver site and/or one or more of the adjacent radio communications transceiver sites from the background information are provided, collected, received or retrieved through relevant means. The operation and maintenance logs include information such as, but not limited to, network instability issues and outage issues caused by equipment malfunction or planned maintenance activities.

The operation and maintenance logs are analyzed with an operation and maintenance log analysis algorithm in order to produce an equipment disruption service disruption probability factor. The equipment disruption service disruption probability factor indicates the probability that an equipment malfunction or a planned maintenance activity resulted in disrupting cellular service provided by one or more of the adjacent radio communications transceiver sites within the specified geographical region during the specified time period.

Figure 7:
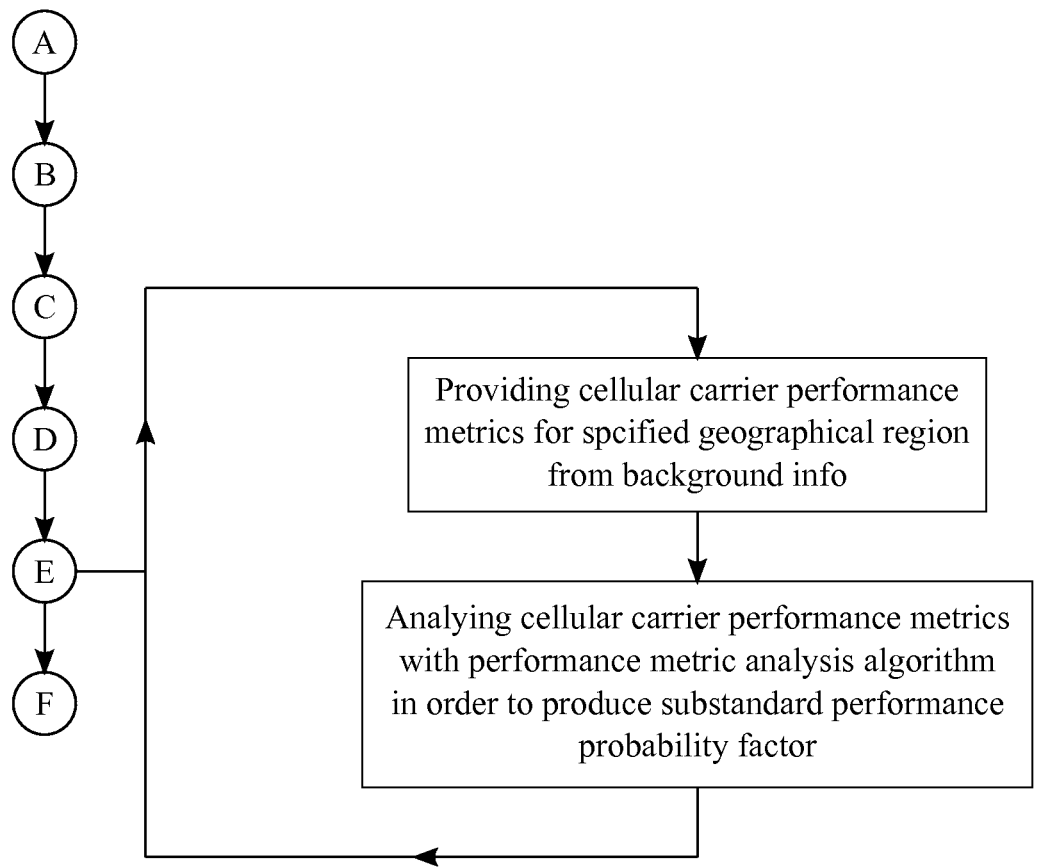
FIG. 7 is a stepwise flow diagram describing the cellular carrier performance metric analysis process.

A fourth process from the plurality of coverage modification factor analysis processes is a cellular carrier performance metric analysis process as described in FIG. 7. In the cellular carrier performance metric analysis process, cellular carrier performance metrics for the specified geographical region from the background information are provided, collected, received or retrieved through relevant means. The cellular carrier performance metrics include, but are not limited to: all counters collected from radio network controllers including all communications related interfaces, all mobile uplink access counters, service usage counters, paging counters, cell performance data for the prior month, including a subset of the above requested counters with the best possible collection resolution.

The cellular carrier performance metrics are analyzed with performance metric analysis algorithm in order to produce a substandard performance probability factor. The substandard performance probability factor indicates the probability that substandard performance by specified radio communication transceiver site resulted in disrupting cellular service provided by the specified radio communication transceiver site and/or one of the adjacent radio communications transceiver sites within the specified geographical region during the specified time period.

Figure 8:
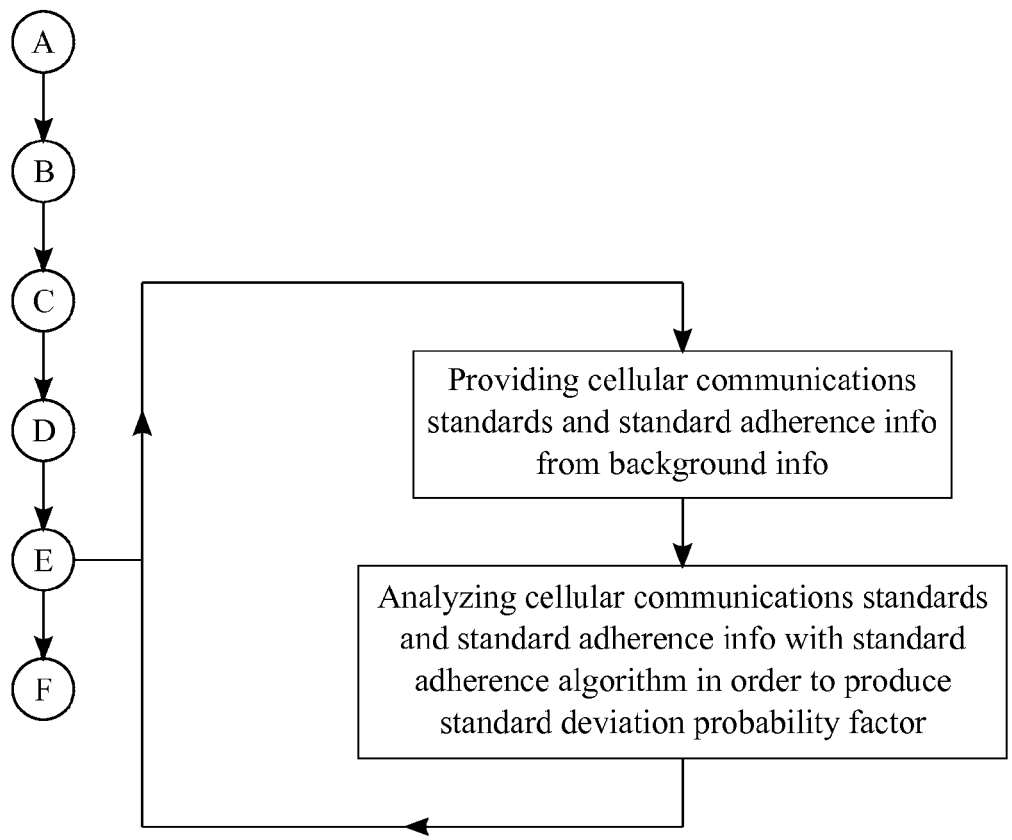
FIG. 8 is a stepwise flow diagram describing the cellular communications standards analysis process.

A fifth process from the plurality of coverage modification factor analysis processes is a cellular communications standards analysis process as described in FIG. 8. In the cellular communications standards analysis process, communications standards are reviewed and any potential failure to adhere to related standards for any component of the communication process is determined. Cellular communications standards and standard adherence information from the background information are provided, collected, received or retrieved through relevant means. The cellular communications standards correspond to the specific architecture of the cellular carrier from which the cellular communications standards and standard adherence information were obtained.

The cellular communications standards and standard adherence information are analyzed with a standard adherence algorithm in order to produce a standard deviation probability factor. The standard deviation probability factor indicates the probability that failure by the cellular carrier network operations to adhere to industry standards resulted in disrupting cellular service provided by the specified radio communication transceiver site and/or one of the adjacent radio communications transceiver sites within the specified geographical region during the specified time period. For the sake of clarity, in this instance "standard deviation probability factor" refers not to the statistical term but to a more general deviation from standards in the context of cellular communication.

To recap, the plurality of potential cellular wireless signal coverage modification factors includes, but is not necessarily limited to, a traffic loading service disruption probability factor, a weather event service disruption probability factor, an equipment disruption service disruption probability factor, a substandard performance probability factor, and a standard deviation probability factor.

Figure 9:
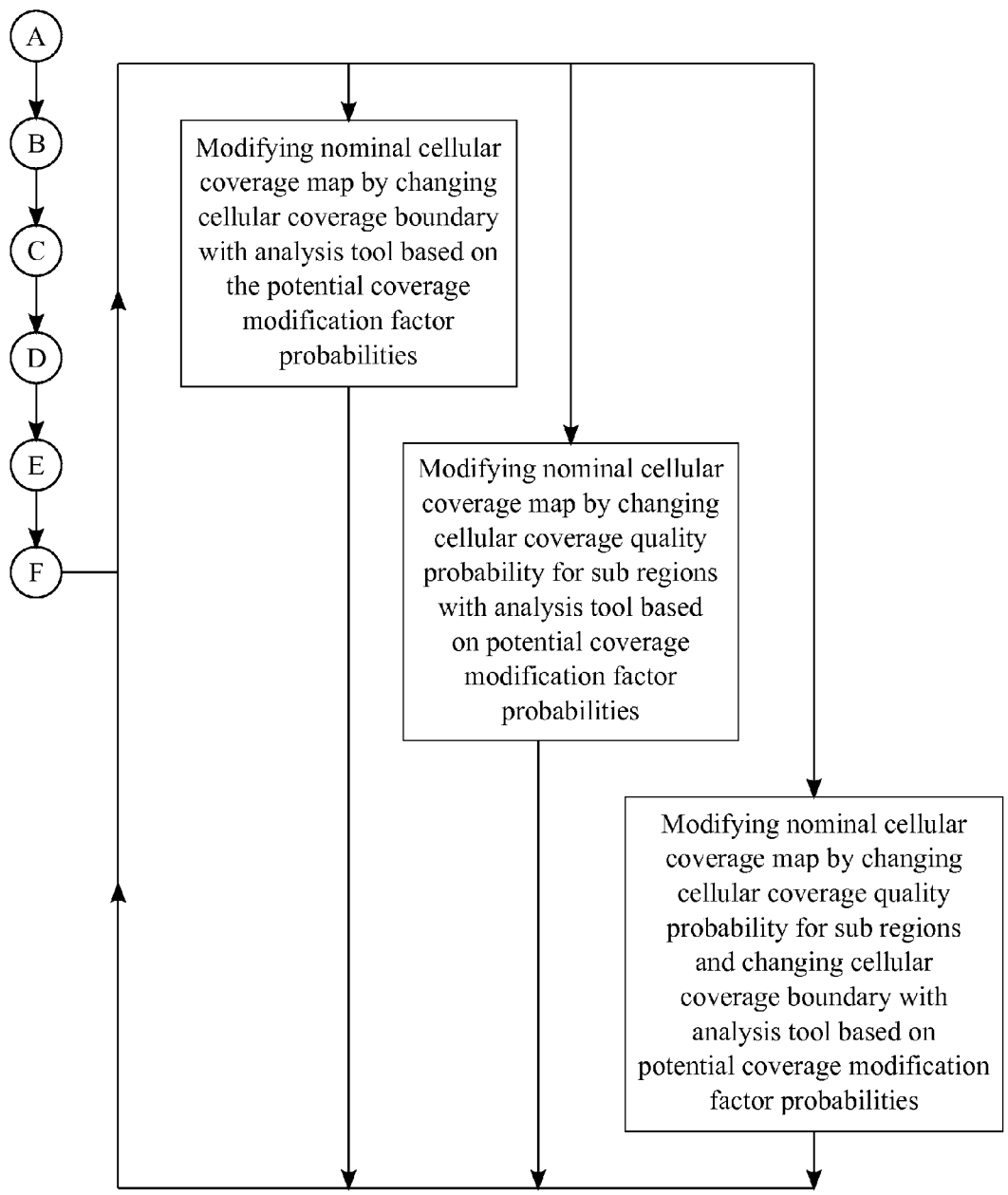
FIG. 9 is a stepwise flow diagram describing the process for generating the time-specific cellular wireless signal coverage map.

After each of the plurality of potential cellular wireless signal coverage modification factors is obtained by executing the plurality of coverage modification factor analysis processes, a time-specific cellular wireless signal coverage map is generated with a final analysis tool by modifying the nominal cellular wireless signal coverage map based on the plurality of potential cellular wireless signal coverage modification factors, as described in FIG. 9.

The time-specific cellular wireless signal coverage map is a modification of the nominal cellular wireless signal coverage map that takes into account the previously discussed phenomena which could possibly have caused a disruption in the cellular wireless signal coverage during the specified time period. The nominal cellular wireless signal coverage map does not take these factors into account, and therefore provides potentially flawed information regarding the cellular wireless signal coverage within the specified geographical location during the specified time period.

It should be noted that while the final analysis tool is not described in particular herein, it should be understood that the final analysis tool utilizes one or a combination or more than one currently known tools and methods for performing the processes described herein, including, but not limited to: human notation, a software database tool such as Microsoft Excel, Sequential Query Language or Structured Query Language, signals analysis software, radio frequency propagation analysis software or other specialty database software application, mapping software, and/or topographical mapping software.

In order to produce the time-specific cellular wireless signal coverage map, the final analysis tool is used to modify the nominal cellular wireless signal coverage map either by shrinking, expanding, or otherwise changing the cellular coverage boundary, by changing the cellular wireless signal coverage quality probability for at least one of the sub regions, or by changing both the cellular coverage boundary and the cellular wireless signal coverage quality probability based on at least one of the potential wireless signal coverage modification factor probabilities.

Although the invention has been explained in relation to its preferred embodiment, it is to be understood that many other possible modifications and variations can be made without departing from the spirit and scope of the invention as hereinafter claimed.

What is claimed is:

1. A method of validating cellular device location record accuracy comprises the steps of:
   providing background information, wherein the background information includes a cellular subscriber activity record, radio communications transceiver site location information, and a plurality of technical configuration characteristics for a specified radio communications transceiver site;
   wherein the radio communications transceiver site location information includes geographical location records for the specified radio communications transceiver site and adjacent radio communications transceiver sites;

wherein the specified radio communications transceiver site and the adjacent radio communications transceiver sites are associated with a cellular carrier and provides cellular service to a specified geographical region;

wherein the cellular subscriber activity record corresponds to a specified cellular device;

wherein the specified cellular device is registered with the cellular carrier;

wherein the cellular subscriber activity record indicates the specified cellular device being registered to the specified radio communications transceiver site during a specified time period;

generating a radio communications transceiver site map from the radio communications transceiver site location information;

verifying the geographical location records for the specified radio communications transceiver site and the adjacent radio communications transceiver sites as correct;

producing a nominal cellular wireless signal coverage map for the specified radio communications transceiver site from the radio communications transceiver site map with a radio frequency propagation analysis tool, wherein the nominal cellular wireless signal coverage map describes a cellular wireless signal coverage boundary around the specified radio communications transceiver site and the adjacent radio communications transceiver sites and cellular wireless signal coverage quality probability for a plurality of sub regions within the cellular coverage boundary;

wherein the radio frequency propagation analysis tool is used to determine reflection, refraction, absorption or other radio frequency modification factors affecting cellular service to the specified geographical region;

executing a plurality of coverage modification factor analysis processes on the background information in order to determine a plurality of potential cellular wireless signal coverage modification factors for the specified geographical region during the specified time period; and generating a time-specific cellular wireless signal coverage map with a final analysis tool by modifying the nominal cellular wireless signal coverage map based on the potential cellular wireless signal coverage modification factors.

2. The method of validating cellular device location record accuracy as claimed in claim 1 further comprises the steps of:

collecting observed geographical locations for the specified radio communications transceiver site and the adjacent radio communications transceiver sites;

comparing the observed geographical locations with the geographical location records with a geographical location analysis algorithm; and designating the cellular subscriber activity record as inaccurate, if the observed geographical locations cannot be collected; or if the observed geographical locations do not match the geographical location records.

3. The method of validating cellular device location record accuracy as claimed in claim 2, wherein the observed geographical locations are collected using a global positioning system capable instrument, an internet search tool, or an aerial image viewing tool.

4. The method of validating cellular device location record accuracy as claimed in claim 1 further comprises the steps of:

collecting on-site wireless cellular service test data for the specified geographical region; and producing the nominal cellular wireless signal coverage map from the on-site wireless cellular service test data using an on-site wireless cellular service test mapping application, wherein the on-site wireless cellular service test mapping application is a desired radio frequency propagation analysis tool.

5. The method of validating cellular device location record accuracy as claimed in claim 1 further comprises the step of:

producing the nominal cellular wireless signal coverage map by analyzing the plurality of technical configuration characteristics with a predictive cellular coverage application.

6. The method of validating cellular device location record accuracy as claimed in claim 1 further comprises the steps of:

collecting topographic data for the specified geographical region; and producing the nominal cellular wireless signal coverage map by analyzing the topographic data using a topographic analysis tool, wherein the topographic analysis tool is a desired radio frequency propagation analysis tool.

7. The method of validating cellular device location record accuracy as claimed in claim 1 further comprises the steps of:

providing subscriber aggregating event information and traffic congestion control policies for the radio communications transceiver site from the background information, wherein the subscriber aggregating event information indicates events causing a gathering of cellular subscribers near the specified radio communications transceiver site and/or one or more of the adjacent radio communications transceiver sites;

analyzing the technical configuration characteristics and traffic congestion policies to determine a traffic loading threshold for the specified radio communications transceiver site, wherein the traffic loading threshold indicates a maximum for cellular subscribers registered to the specified radio communications transceiver site and/or one or more of the adjacent radio communications transceiver sites at one time; and producing a traffic loading service disruption probability factor with a traffic loading analysis algorithm using the traffic loading threshold and the subscriber aggregating event information, wherein the traffic loading disruption probability factor indicates a probability that a traffic loading event resulted in disrupting cellular service provided by one or more of the adjacent radio communications transceiver sites within the specified geographical region during the specified time period.

8. The method of validating cellular device location record accuracy as claimed in claim 1 further comprises the steps of:

providing historical weather records from the background information; and analyzing the historical weather records with a weather record analysis algorithm in order to produce a weather event service disruption probability factor, wherein the weather event service disruption probability factor indicates a probability that a weather event resulted in disrupting cellular service provided by the specified radio communications transceiver site and/or one or more of the adjacent radio communications transceiver sites within the specified geographical region during the specified time period.

9. The method of validating cellular device location record accuracy as claimed in claim 1 further comprises the steps of:

providing operation and maintenance logs for the specified radio 30 communications transceiver site from the background information; and analyzing the operation and maintenance logs with an operation and maintenance log analysis algorithm in order to produce an equipment disruption service disruption probability factor, wherein the equipment disruption service disruption probability factor indicates a probability that an equipment malfunction or a planned maintenance activity resulted in disrupting cellular service provided by one or more of the adjacent radio communications transceiver sites within the specified geographical region during the specified time period.

10. The method of validating cellular device location record accuracy as claimed in claim 1 further comprises the steps of:

providing cellular carrier performance metrics for the specified geographical region from the background information; and analyzing the cellular carrier performance metrics with a performance metric analysis algorithm in order to produce a substandard performance probability factor, wherein the substandard performance probability factor indicates a probability that substandard performance by specified radio communications transceiver site resulted in disrupting cellular service provided by the specified radio communications transceiver site and/or one of the adjacent radio communications transceiver sites within the specified geographical region during the specified time period.

11. The method of validating cellular device location record accuracy as claimed in claim 1 further comprises the steps of:

providing cellular communications standards and standard adherence information from the background information; and analyzing the cellular communications standards and standard adherence information with a standard adherence algorithm in order to produce a standard deviation probability factor, wherein the standard deviation probability factor indicates a probability that failure by the cellular carrier network operations to adhere to industry standards resulted in disrupting cellular service provided by the specified radio communications transceiver site and/or one of the adjacent radio communications transceiver sites within the specified geographical region during the specified time period.

12. The method of validating cellular device location record accuracy as claimed in claim 1 further comprises the step of:

modifying the nominal cellular wireless signal coverage map by changing the cellular wireless signal coverage boundary with the final analysis tool based on at least one of the potential cellular wireless signal coverage modification factors.

13. The method of validating cellular device location record accuracy as claimed in claim 1 further comprises the step of:

modifying the nominal cellular wireless signal coverage map by changing the cellular wireless signal coverage quality probability for at least one of the sub regions with the final analysis tool based on at least one of the potential cellular wireless signal coverage modification factors.

14. The method of validating cellular device location record accuracy as claimed in claim 1 further comprises the step of:

modifying the nominal cellular wireless signal coverage map by changing the cellular wireless signal coverage quality probability for at least one of the sub regions and changing the cellular wireless signal coverage boundary with the final analysis tool based on at least one of the potential wireless cellular signal coverage modification factors.

* * * * *